Dec. 27, 1966    F. D. LONG    3,294,615
PLASTIC BAG MAKING MACHINE
Filed July 5, 1963    3 Sheets-Sheet 1
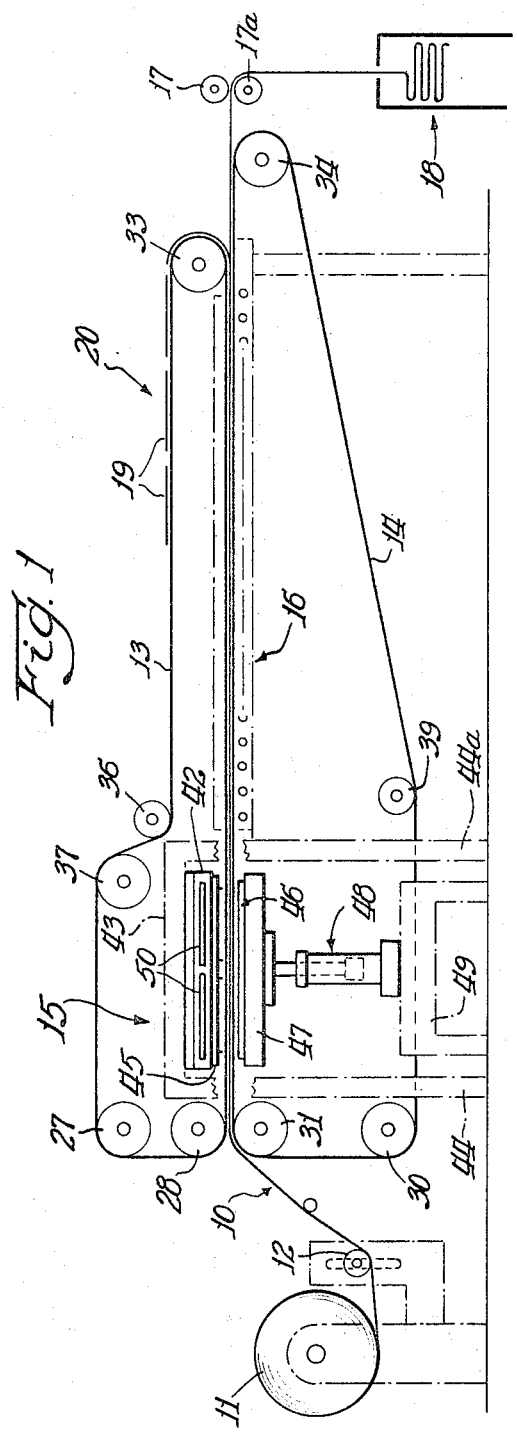
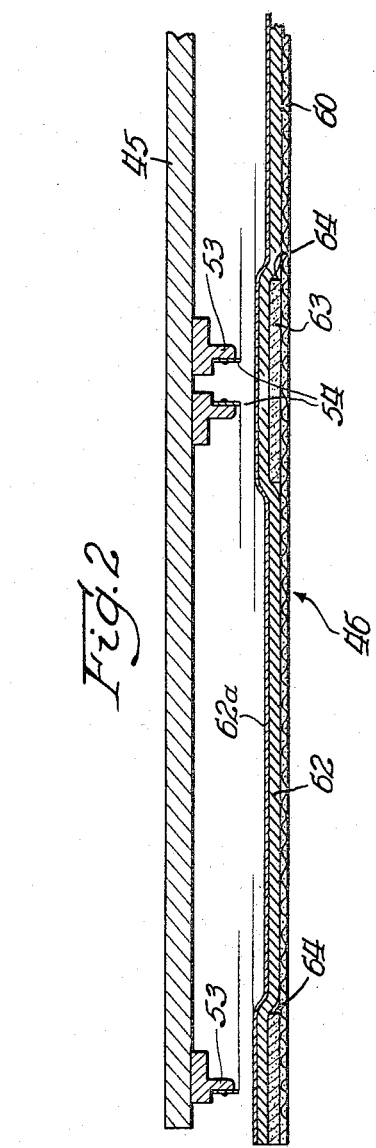
Inventor:
Fleming D. Long
By: Richard W. Carpenter  Atty.

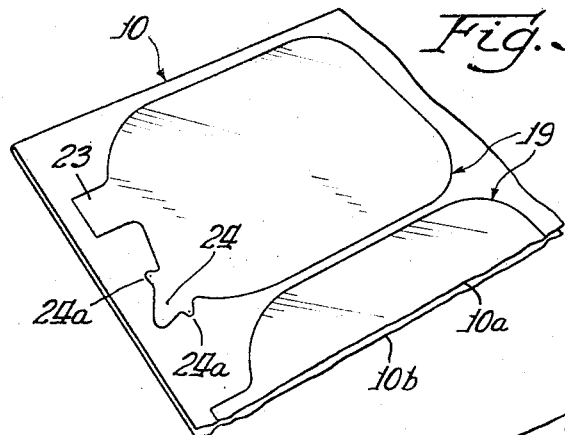
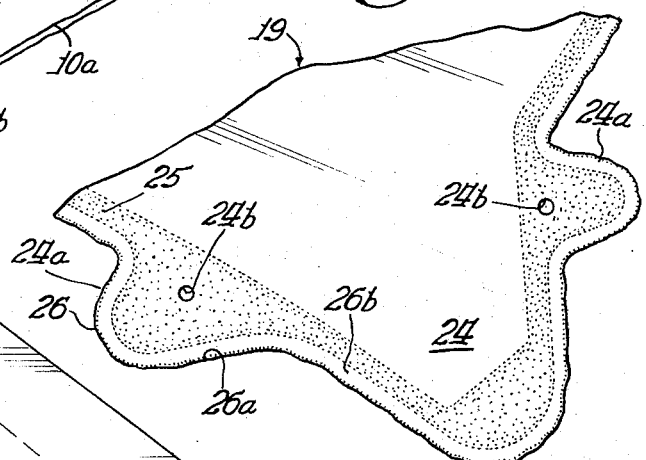
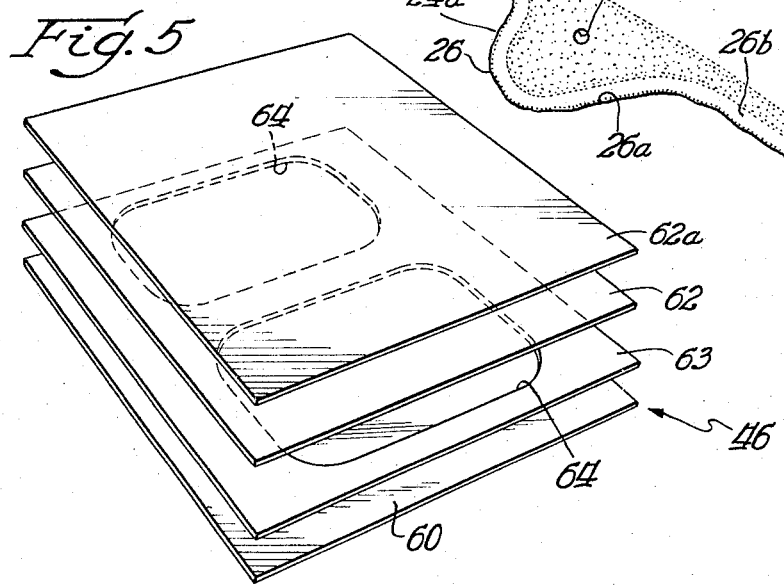
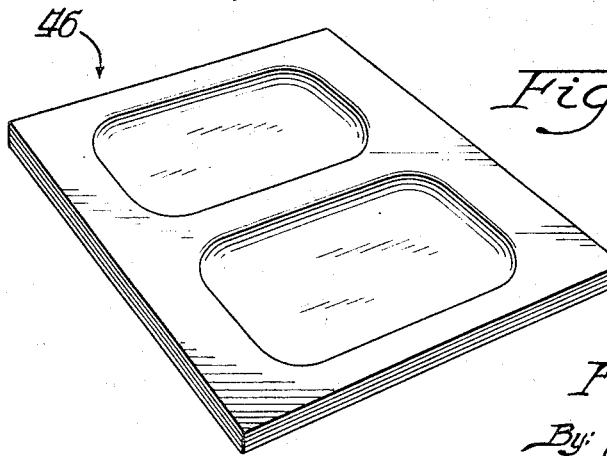

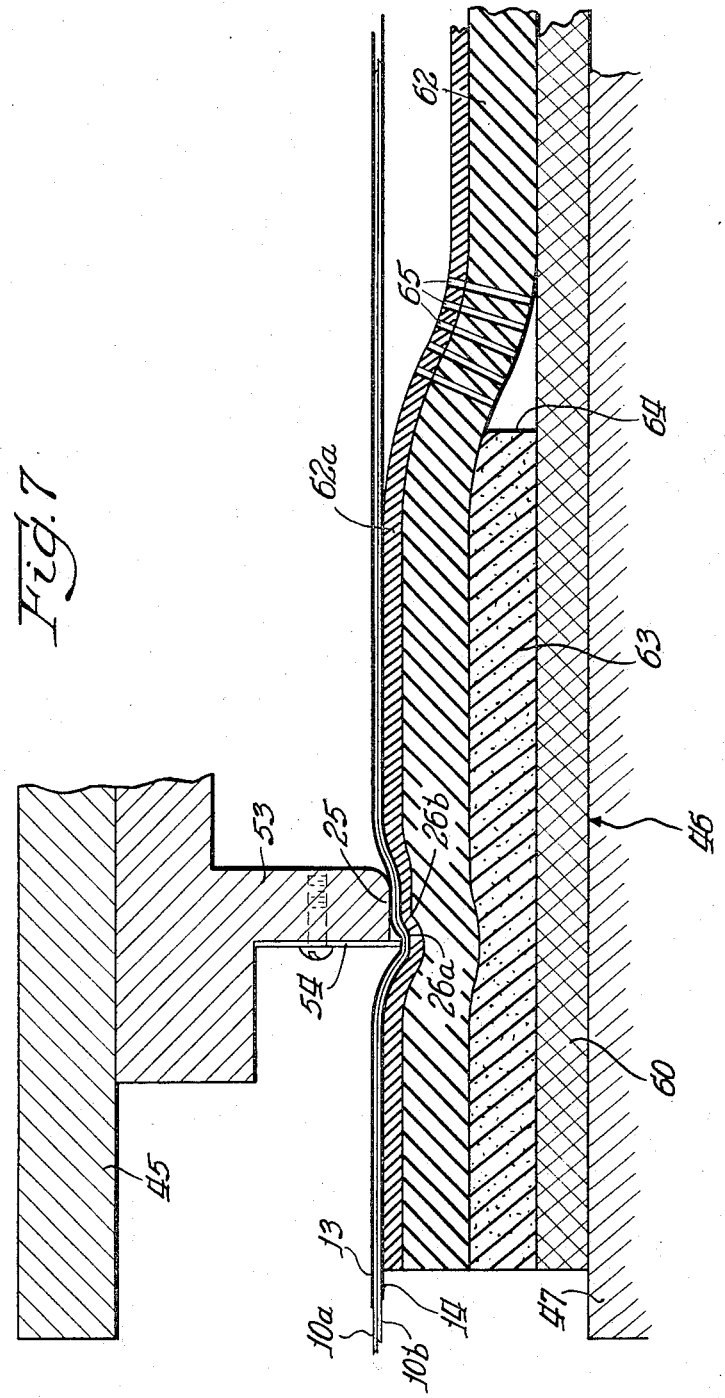

United States Patent Office 3,294,615
Patented Dec. 27, 1966

3,294,615
PLASTIC BAG MAKING MACHINE
Fleming Desmond Long, Monmouth, Ill., assignor to Container Corporation of America, Chicago, Ill., a corporation of Delaware
Filed July 5, 1963, Ser. No. 292,900
24 Claims. (Cl. 156—537)

The present invention relates to a machine and process for the manufacture of flat or collapsed bags formed of superposed layers of thermoplastic sheet material.

Among the more important objects of the invention are to provide improved and highly efficient mechanism for forming flattened or collapsed bags with accurately shaped contours or configurations; to provide effective mechanism for securely welding two adjacent, thermoplastic films to form the edge portions of a bag without the tendency of reducing the thickness of the composite, welded wall portions; and to provide improved mechanism acting to cut, or sufficiently weaken, the film layers outside the contours of the joined areas so that the waste may be readily separated from the completed bags.

Another object of the invention is to provide an improved combination of upper and lower separator members or belts, for containing adjacent bag-forming films or webs, and heated die and backing or pressure-receiving members capable of applying pressure to the films through the belts and at the same time supplying a controlled amount of heat and pressure to the films to produce strong, secure and leak proof welded areas delineating the bag contours.

A further object of the invention is to provide an improved form of pressure-receiving die for cooperation with a heated die member which is controlled to apply heat and pressure through thin flexible belts or other separator members arranged above and below the superposed bag-forming films.

A further object of the invention is to provide an improved process for the production of flat collapsed, contoured bags from superposed films of thermoplastic material.

A still further object is to provide a novel plastic bag construction.

Additional and more specific objects and advantages of the invention will become apparent as the description proceeds.

In the drawings:

FIGURE 1 is a diagrammatic, side elevational view showing the general arrangement of the belts between which the two layers of thermoplastic film are conducted, and showing upper and lower die elements for applying heat and pressure to the film layers;

FIGURE 2 is an enlarged, fragmentary detail view, with the belts and film omitted, showing the relationship of the contoured die and pressure receiving die;

FIGURE 3 is a fragmentary perspective view of a section of superposed layers of bag forming film showing the novel contoured bag after being formed and still in place before removal of waste areas;

FIGURE 4 is an enlarged fragmentary view of a portion of the dispensing spout of the bag to illustrate the tabs for holding the spout in place within a dispenser;

FIGURE 5 is an exploded view showing the layers from which the pressure receiving die is formed;

FIGURE 6 is a perspective view of the assembled pressure receiving die; and

FIGURE 7 is an enlarged, fragmentary, cross-sectional view illustrating a portion of the contoured die member in contact with portions of the belts and contained film layers and pressing such portions against the pressure receiving die.

The mechanism for carrying out the present invention, as disclosed herein, comprises means for feeding two layers of thermoplastic sheet material, either as separate webs or in the form of a flattened tube, past a pair of welding and cutting die members to form bags or similar articles. At least one of the cooperating die members is maintained at the necessary temperature to weld the two thermoplastic sheets together along desired regions or areas and suitable release or separator means is employed to prevent the heated die portions from adhering to the welded areas of the sheets. As herein disclosed, the release or separator means take the form of flexible belts between which the thermoplastic films are enclosed. Upon separation of the die members from pressure contact upon the sheets through the belts, the welded bags are advanced to a cooling section and subsequently to an area where the belts are moved apart and the scrap or waste material is carried to scrap collection receptacles. The completed bags remain temporarily attached to one of the belts and are removed at a suitable point.

Referring more particularly to the drawings, the bag forming material is preferably supplied as a flat tube to provide superposed layers or films of thermoplastic material. The tubular web indicated at 10 is fed from a roll 11 past a suitable dancer roll 12 mounted for bodily movement to keep the web tensioned. The web then passes between upper and lower belts 13 and 14 and into the bag forming station, designated as a whole at 15. The belts are intermittently driven by suitable means not shown and remain at rest for a brief period while the layers of the tubular web 10 are being treated. Upon leaving the bag forming station the web is carried by the belts into a cooling section 16. As the belts emerge from the cooling section they are separated and the waste portions are drawn by pull rolls 17, 17a into a waste receptacle 18. The finished bags, indicated at 19, 19 adhere to the upper belt 13 and are removed by hand or suitable mechanical means at the removal station 20.

An example of one form of article, which may be produced by the mechanism and process herein disclosed, is illustrated in FIGURE 3, in which there is shown a completely closed bag, generally indicated at 19, having rounded contours and a pair of projecting parts 23 and 24, the first of which is particularly designed for ease in filling the bag and the other being designed for dispensing of the contents. The two film layers 10a and 10b of the web 10 are adhered or welded along a strip or region indicated at 25 which may vary in extent, but for practical purposes, has a width of one-eighth inch to one-quarter inch. Spaced from the welded strip 25 is a strip or line 26, forming the edges of the finished bag, preferably produced simultaneously with the welding process, and resulting in cutting or sufficiently weakening the superposed films so that the finished bags may be separated readily from the surrounding scrap or waste material.

The material employed for the manufacture of bags or other articles contemplated herein may be relatively thin polyethylene film or other heat-sealable, thermoplastic sheet material. For the purpose of producing bags or similar containers for retention of food and beverage products, requiring adherence to maximum standards of cleanliness, it is preferred to employ thermoplastic sheet material supplied in the form of a continuous flat tube.

The upper belt 13 is arranged to pass around suitably supported, vertically spaced rolls 27 and 28 on the intake side of the welding station 15. On the outlet side the belt 13 passes directly through the cooling section. The lower belt 14 passes around suitably supported vertically spaced rolls 30 and 31 located on the intake side of the bag forming station and, after passing therethrough, the belt will remain in contact with the newly formed bags in place within the web 10.

The two belts then conduct the treated webs through the cooling section 16. On emerging from the cooling section, the upper belt passes around roll 33 and the lower belt passes around roll 34 which may be supported somewhat beyond the roll 33. The belts are thus moved apart after passing roll 33. The waste material is engaged between the pair of pull rolls 17, 17a, previously referred to, and such waste is directed into a suitable receptacle 18 or other waste receiver.

According to a convenient arrangement, preferably by employing an upper belt 13 which is thinner than the lower belt, the completely formed bags are caused to adhere to the upper belt 13 and are carried around roll 33 to the removal station 20. At this point the bags are removed by hand or by any suitable mechanical means. The upper belt then travels back toward the intake side of the forming station past rolls 36 and 37 to the rolls 27 and 28. The lower belt, after leaving roll 34, passes under roll 39 back to rolls 30 and 31.

Both upper and lower belts may be driven from a common driving means, not shown, such driving means including conventional mechanism for advancing the belts uniformly in a step-by-step travel, allowing an adequate time interval for the welding mechanism to operate on the superposed films.

The bag welding and cutting mechanism at forming station 15 comprises a heated top platen 42 suitably supported on the underside of a horizontal frame member 43, connected to vertical supports 44, 44a. A die frame member, indicated at 45, on which there are attached suitably contoured die elements, is secured, as by means of bolts or clamps, on the underside of the platen 42. A complementary, pressure receiving die, indicated generally at 46, is arranged to be secured in fixed position on a lower platen 47. This platen is arranged to be raised and lowered by a piston and cylinder mechanism 48, supported on a frame structure 49 having provision for the lower belt 14 to pass beneath the cylinder. By this construction, as the belts are stopped in their forward travel with the film layers between them, the lower die element will be moved upward by the piston and cylinder mechanism to bring it against the assembled belts and films to press them against the upper die element. The die is then held in this position with sufficient pressure and for the necessary time interval to complete the weld between the film layers. At the same time the cutting portions of the die will sever the film layers or weaken them sufficiently to enable the bags to be removed readily from the tubular web.

In the present instance, heat is supplied only to the upper die element and for this purpose thermostatically controlled heating units 50, 50 may be suitably arranged within the top platen member 42. Additional controlled heating units may also, if desired, be arranged within the frame 45 of the upper die element to assure transmission of the desired amount of heat to the belt-contacting portions of the die.

It is to be understood that the positions of the upper and lower die elements may be reversed, and that heat may be supplied to the die element supported on the movable platen 47, if desired.

It is preferred to employ upper and lower belts of thin, strong, heat-resistant material, permitting quick and uniform transmission of heat to the superposed layers to be welded. At the same time the belts act to separate the films from the dies and such belts should not adhere appreciably to the dies. Satisfactory belting for this purpose may be provided by employing suitable glass fiber fabric, backed by a thin film or coating of rubber, and capable of operating at temperatures up to approximately 600° F. Additionally, the belt fabric may be treated by coating it with silicone. Both upper and lower belts may be of approximately the same thickness and flexibility, but it is considered preferable to use a somewhat thicker and less flexible belt on the side of the web next to the pressure receiving die 46 and opposite the heated die elements on frame 45. By employing a belt of rubber-backed glass fiber, next to the heated die, having a thickness of approximately .010 inch, a quick transmission of heat is effected from the heated die to the superposed films, and the belt, due to its flexibility, tends to conform to the contour of the die elements and permit pressure and heat to be applied evenly throughout the extent or perimeter of the die to produce uniformly welded seams. A satisfactory belt for use next to the pressure receiving die 46 may have a thickness in excess of .010 inch and not substantially more than .020 inch.

The upper die element 45, as above indicated, is formed as a removable frame which carries a contoured welding portion 53 and a film cutting or disrupting portion 54 in the form of a relatively narrow metal rule. The welding portion 53 is formed of a relatively hard, heat-conducting material. The welding and cutting parts may receive their heat entirely from the heating units 50 in the frame or, if desired, supplemental resistance coils may be employed to supply heat more directly to the welding and cutting parts. The amount of heat supplied is controlled by a suitable thermostat in a conventional manner.

It is important that the pressure of the welding part which is transmitted to the film layers is controlled in such a manner that it is not so great as to cause the plastic film to flow appreciably under the influence of the heat transmitted to the film by the welding portion. Accordingly, the construction is such that the lower platen is moved a predetermined distance upward and the amount of pressure between the die elements is determined by the resiliency of the pressure-receiving, lower die element. To obtain this result the lower platen is controlled so as to cause the welding die to depress the surface of the laminated pressure-receiving die approximately $\frac{1}{16}$ to $\frac{1}{8}$ of an inch when operating at a temperature in the range from 450° to 600° F., with a dwell time of between one and two seconds and with a fiber glass top belt of thickness of .010 inch.

The lower die element is preferably formed as a built-up, resilient backing device presenting a relatively smooth and generally flat, compression resisting surface to receive the pressure applied by the upper, contoured die when the lower platen is moved upward.

To provide a highly durable form of lower die, capable of assuring production of plastic bags of a high standard over extended runs, such die may be constructed with a relatively stiff backing material, such as woven belt 60 having secured thereon a layer 63 of relatively soft, yieldable, compression resisting material, combined with one or more overlying layers of somewhat stiffer, or less yieldable, compression resisting material. A satisfactory surface material for this lower die element is a thin sheet 62a of neoprene rubber, or a sheet having similar characteristics, of a thickness of approximately $\frac{1}{16}$ inch and having a durometer of 35 to 45. Immediately below the surface sheet there is preferably included a somewhat softer and somewhat thicker sheet 62 of pure gum rubber or a sheet of similar characteristics, with a durometer of 25 to 35, and having a thickness of the order of approximately $\frac{1}{4}$ inch. Below the gum rubber sheet there is preferably included a sheet approximately $\frac{1}{4}$ inch thick of soft sponge rubber indicated at 63 which is adhered to the woven belt backing. This belting, used as a base for the lower die, is preferably approximately $\frac{3}{16}$ inch in thickness and has a texture equivalent to Burrell N155 Burtek belting.

While the welding portion 53 of the die is in the process of joining the films, the cutting portion 54 of the die, projecting somewhat below the portion 53, is caused to bear with considerable force against the belts and superposed films with the result that a narrow band or area outside the band of weld is substantially disrupted to permit the completed bag to be separated readily from the surrounding web. The advancing belts and film layers, forced upward by the pressure-receiving die, first contact the cutting portion 54 which causes the die 46 to be depressed and somewhat embeds the immediately underlying belt and film assembly into the die. This causes momentary tension in the belts and film layers as the unaffected or undepressed die portions advance and are brought into initial pressing relation with the belt and film assembly. This tensioning of the belts and films against the undepressed, or only slightly depressed, die portions tends to smooth the belt and film assembly momentarily before such assembly is forced into firm contact with the welding portion 53. The sequence of the action is, of course, very rapid and only a small time interval will elapse between the time that the cutting portion is in full contact with the belt and film assembly and the time that the welding portion is in its condition of full contact. The interval is so short that the films are not immediately disrupted but remain under control of the cutting portion until the belt and film assembly has been forced against the welding portion.

As the heated cutting portion 54 causes the belt and film assembly to become somewhat embedded into the die 46 the lower surface of the portion 54 causes disruption of the film and, at the same time, there is formed a narrow band of welded seam 26a just inside the disrupted line 26. This welded seam is produced by contact of the lateral face of the cutting portion which is disposed adjacent the welding portion 54.

Between the narrow welded seam 26a and the principal welded area 25 there is a band, indicated at 26b, over which no direct die pressure is exerted. This band however, receives some degree of pressure against the lower die due to the pressure being applied by the cutting and welding portions at the two sides of the band. The film layers in this area 26b thus become lightly adhered. By this arrangement, any possible or unusual flaw in the principal welded area 25 formed by the welding portion 54 which might allow leakage tends to be counteracted by the narrow firmly welded band outside the lightly adhered band 26b, with the result that any leakage which might occur will be stopped by the narrow weld 26a.

For the purpose of preventing any tendency of the superposed piles to become attached or partially welded within the interior areas of the collapsed bags inside the contour of the welded strip, a relieved area is provided in one of the interior layers of the built-up die element. In the present instance this is done by cutting from the sponge rubber sheet a piece somewhat smaller than the area enclosed within the welded strip and having a generally similar contour. This cut-away or relieved portion is indicated at 64 in FIGURES 5 and 7. Air vent openings 65 are formed in the superposed sheets to permit egress of the entrapped air from the relieved area of the built-up die element at the time the dies are brought into pressure contact against the separator members during the welding operation.

If desired, the gum rubber sheet may be depressed into the relieved area and cemented to the woven belt backing 60 to hold it in such position, as shown in FIGURE 7.

The firm, though relatively limited, pressure of the lower die against the welding portion assures complete welding of the thermoplastic films without causing the thermoplastic material to flow and without appreciable reduction in the combined thickness of the films.

The bags are preferably, but not necessarily, formed with a completely closed band or region of weld 25. The finished bags may thus be delivered to the packers in a completely sanitary condition.

When it is desired to fill the bag, it may be placed within an outer container, such as a corrugated paperboard box, and the seal at the end of the projecting part 23 is cut away to provide a filling opening. After the bag has received its contents, the newly formed opening may be reclosed by heat sealing or any other desired manner. The filled bag, enclosed in a container is then ready to have its contents dispensed by cutting away the welded marginal portion at the extremity of the projecting part 24 to provide an opening. A sufficient length of the part 24 is left to provide a controllable dispensing spout. Such spout may then be selectively opened and closed by a suitable clamping means, such as disclosed in the application of Stuart Rabb, Jr. et al., Serial No. 186,191, filed April 9, 1962, now Patent No. 3,100,506.

The bag, as herein shown, is formed with a pair of small projecting tabs 24a, 24a at the opposite sides of the dispensing part 24. Within each of the tabs there is provided an opening 24b which may be formed by pins, equivalent in effect to a small section of the cutting portion 54 of the die, to cause a flow of the thermoplastic material from the area of the opening to be formed and thereby produce sufficient disruption of the films either to form a distinct opening or sufficient thinning of the films to allow an impaling pin to pass easily therethrough.

The tabs 24a, 24a are preferably formed by extending the welded band or area so as to surround the area of the opening 24b and form a substantial welded area around such opening. This assures a double strength wall in the areas surrounding the opening 24b to allow for adequate tensioning of the spout area between the impaling pins in the clamping portions of the dispensing device, such as disclosed in the pending application referred to above.

While the description sets forth a preferred embodiment of thermoplastic bag as well as a preferred form of machine and process by which such form of bag may be produced, it is apparent that numerous specific changes can be made without departing from the spirit of the invention, and it is therefore desired that the embodiment herein disclosed be considered in all respects as illustrative and not restrictive, reference being had to the appended claims rather than to the foregoing description to indicate the scope of the invention.

I claim:

1. In a mechanism for forming contoured bags from two superposed layers of thermoplastic film, the combination of two spaced, cooperating die elements, a pair of thin, flexible separator members extending between the die elements, the separator members being arranged to receive two superposed, thermoplastic films therebetween, means for producing relative movement between the die elements to cause them to exert pressure upon the films through the separator members, one of the dies being formed of hard-surfaced, heat-conducting material, means for supplying heat thereto, said hard-surfaced die being of extended length to form at least the major portion of the perimeter of the bag and having a flattened surface of restricted width substantially parallel to the plane of the superposed films, the companion die element serving as the pressure receiving die, said element comprising a relatively thin surface sheet of neoprene rubber.

2. A mechanism, as defined in claim 1, in which a backing for the neoprene rubber sheet is provided which includes a soft sponge rubber sheet.

3. A mechanism, as defined in claim 1, in which a backing for the neoprene sheet is provided which includes a soft sponge rubber sheet and a relatively stiff belting fabric sheet secured to the opposite surface of the sponge rubber sheet.

4. A mechanism, as defined in claim 1, in which a backing for the neoprene rubber sheet is provided which includes a gum rubber sheet secured to the neoprene rubber sheet.

5. A mechanism, as defined in claim 1, in which a backing for the neoprene rubber sheet is provided which includes a gum rubber sheet secured to the neoprene rubber sheet and a sponge rubber sheet secured to the opposite surface of the gum rubber sheet.

6. A mechanism, as defined in claim 1, in which a backing for the neoprene rubber sheet is provided which includes a gum rubber sheet secured to the neoprene rubber sheet, a sponge rubber sheet secured to the opposite surface of the gum rubber sheet, and a relatively stiff belting type fabric sheet secured to the opposite surface of the sponge rubber sheet.

7. In a mechanism for forming contoured bags from two superposed layers of thermoplastic film, the combination of two spaced, cooperating die elements, a pair of thin, flexible separator members extending between the die elements, the separator members being arranged to receive two superposed, thermoplastic films therebetween, means for producing relative movement between the die elements to cause them to exert pressure upon the films through separator members, one of the dies being formed of hard-surfaced, heat-conducting material, means for supplying heat thereto, said hard-surface die being of extended length to form at least the major portion of the perimeter of the bag and having a flattened surface of restricted width substantially parallel to the plane of the superposed films, the companion die element serving as the pressure receiving die, said die element comprising a thin surface layer of yieldable material having the characteristics of neoprene rubber with a durometer scale reading in the range of 35 to 45, such yieldable surface layer having a backing comprising yieldable, compression resisting material.

8. A mechanism, as defined in claim 7, in which the backing for the surface layer includes a sheet having the characteristics of soft sponge rubber.

9. A mechanism, as defined in claim 7, in which the backing for the surface layer includes an interior soft sponge rubber sheet and a relatively stiff sheet of fabric belting type material arranged on the side of the sponge rubber sheet opposite the surface layer.

10. A mechanism, as defined in claim 7, in which the backing for the surface layer includes a gum rubber sheet secured to the surface sheet.

11. A mechanism, as defined in claim 7, in which the backing for the surface layer includes a gum rubber sheet secured to the surface sheet and a sponge rubber sheet secured to the opposite surface of the gum rubber sheet.

12. A mechanism, as defined in claim 7, in which the backing for the surface layer comprises a gum rubber sheet secured to the surface layer, a sponge rubber sheet secured to the opposite side of the gum rubber sheet, and a relatively stiff sheet of belting type fabric material secured to the opposite side of the sponge rubber sheet.

13. A mechanism, as defined in claim 12, in which one of the interior sheets of the built-up pressure-receiving die element, has a relieved or cut-out section of reduced, generally symmetrical contour with the interior edge portions of the hard-surfaced die, whereby a central, sagging area in the surface of the pressure-receiving die is provided.

14. A mechanism, as defined in claim 13, in which air relief vents are formed in the layers of the pressure-receiving die extending from the exterior of the die to the cut-out section.

15. A mechanism, as defined in claim 13, in which air relief vents are formed in the layers of the pressure-receiving die, extending from the central, sagging area in the surface layer to the interior cut-out section.

16. A mechanism, as defined in claim 8, in which the sheet having characteristics of soft sponge rubber has a relieved or cut-out section of reduced, generally symmetrical contour with the interior edge portions of the hard-surfaced die, whereby a central, sagging area in the surface of the pressure receiving die is provided to assure the withholding of the central portion of the flat bag, while being formed, from pressure contact with the separator members.

17. In a mechanism for forming contoured bags from two superposed layers of thermoplastic film, the combination of two spaced, cooperating die elements, a pair of thin, flexible separator members extending between the die elements, the separator members being arranged to receive two superposed, thermoplastic films therebetween, means for producing relative movement between the die elements to cause them to exert pressure upon the films through the separtor members, one of the dies being formed of hard-surfaced, heat-conducting material, means for supplying heat thereto, said hard-surfaced die being of extended length to form at least the major portion of the perimeter of the bag and having a flattened surface of restricted width substantially parallel to the plane of the superposed films, the companion die element serving as the pressure receiving die, said die element having a surface portion of yieldable, compression resisting material, at least one of the separator members comprising glass fiber fabric.

18. A mechanism, as defined in claim 17, in which the glass fiber fabric separator member comprises the top separator member and has a thickness of .010 inch to .020 inch.

19. A mechanism, as defined in claim 17, in which the glass fiber separator member has a thin coating of rubber on the side contacted by the die.

20. A mechanism, as defined in claim 19, in which the separator member has a coating of silicone.

21. A mechanism, as defined in claim 17, in which the separator member formed of glass fiber fabric has a coating of silicone.

22. A mechanism, as defined in claim 17, in which a contoured, heated cutting element is arranged adjacent the hard-surfaced die element to disrupt the film layers disposed outside and generally symmetrical with the contour of the welded area.

23. A mechanism, as defined in claim 22, in which the cutting element is in the form of a relatively narrow metal rule extending beyond the plane of the flat welding surface of the welding die to compress more deeply into the pressure receiving die, whereby the extremity of the cutting element will disrupt the film layers and the lateral surface of such element will weld a narrow area adjacent the line of disruption.

24. A mechanism, as defined in claim 23, in which there is an effective space between the cutting element and the welding element where no direct pressure is transmitted to the film layers, thus to provide a narrow, relatively unwelded area between the principal welded area and the narrow welded area formed by the lateral face of the cutting element.

References Cited by the Examiner

UNITED STATES PATENTS

| | | | |
|---|---|---|---|
| 2,441,940 | 5/1948 | Rohdin | 156—289 |
| 2,710,046 | 6/1955 | Markus et al. | 156—289 |
| 2,738,828 | 3/1956 | Hammer | 156—289 |
| 2,796,913 | 6/1957 | Fener et al. | 156—251 |
| 2,930,423 | 3/1960 | Cunningham et al. | 150—1 |
| 2,957,513 | 10/1960 | Schneider et al. | 156—251 |
| 3,026,233 | 3/1962 | Scholl et al. | 156—251 |
| 3,074,450 | 1/1963 | Wilkaitis et al. | 150—1 |

EARL M. BERGERT, *Primary Examiner.*

FRANKLIN T. GARRETT, DOUGLAS J. DRUMMOND, J. F. McNULTY, *Assistant Examiners.*